United States Patent [19]

Brefini et al.

[11] 4,186,351
[45] Jan. 29, 1980

[54] SIGNAL STRENGTH INDICATOR CIRCUIT FOR A RADIO RECEIVER EMPLOYING AGC

[75] Inventors: Gary P. Brefini, Winchester; Francis H. Stites, Wayland, both of Mass.

[73] Assignee: GTE Sylvania Incorporated, Stamford, Conn.

[21] Appl. No.: 956,535

[22] Filed: Nov. 1, 1978

[51] Int. Cl.² ............................................. H04B 1/26
[52] U.S. Cl. .................................... 325/398; 325/67; 343/113 R
[58] Field of Search ................ 325/398, 67, 364, 363, 325/455, 319; 343/113 PT, 113 R, 114, 122, 123; 324/76 R, 115, 123 C

[56] References Cited

U.S. PATENT DOCUMENTS

| 3,820,026 | 6/1974 | Messinger | 325/364 |
| 3,965,425 | 6/1976 | Peterson et al. | 325/398 |
| 3,965,425 | 6/1976 | Peterson et al. | 325/364 |
| 4,071,845 | 1/1978 | Gross | 343/113 R |
| 4,128,810 | 12/1978 | Ogita | 325/398 |

Primary Examiner—Benedict V. Safourek
Assistant Examiner—Tommy P. Chin
Attorney, Agent, or Firm—Peter Xiarhos

[57] ABSTRACT

A signal strength meter circuit for an FM radio receiver employing automatic gain control. The signal strength meter circuit includes circuitry for establishing a range of voltages on an AGC line of the receiver corresponding to a range of signals received by the receiver and for providing deflection of a needle of a signal strength meter over the entire range. At such time as AGC circuitry in the receiver draws current from the meter circuit, the meter continues to display this current by the deflection of the needle of the meter.

8 Claims, 3 Drawing Figures

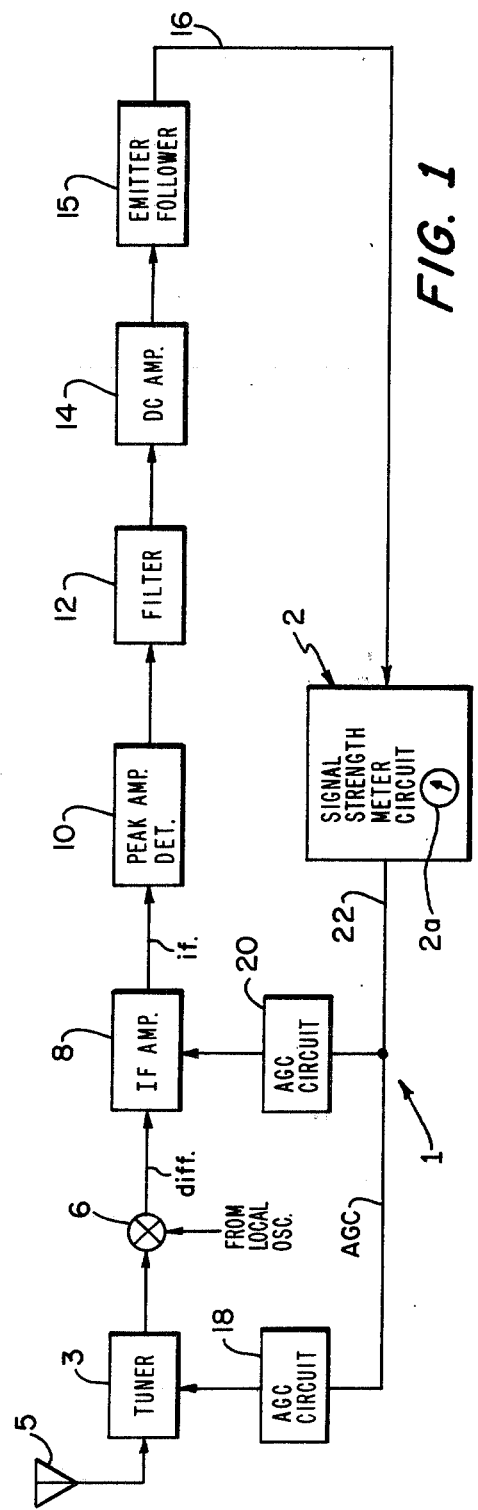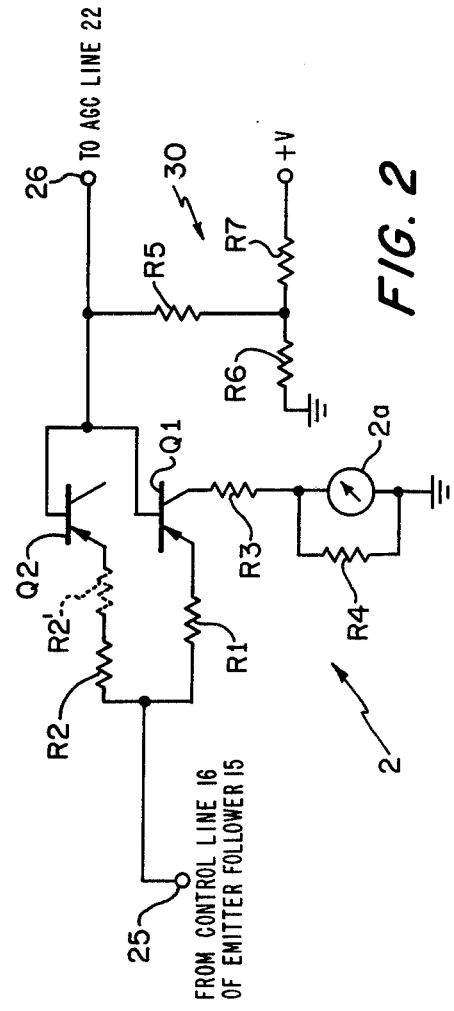

SIGNAL STRENGTH INDICATOR CIRCUIT FOR A RADIO RECEIVER EMPLOYING AGC

BACKGROUND OF THE INVENTION

The present invention relates to a signal strength meter circuit and, more particularly, to a signal strength meter circuit for a radio receiver employing automatic gain control (AGC).

It is often necessary to provide a signal strength meter in a radio receiver to enable the user or operator of the receiver, for example, a pilot of an aircraft, to determine whether the aircraft is moving toward or away from a particular target, such as a transmitter on the ground. Desirably, the signal strength meter should operate in a generally linear fashion over the usable operating range of the receiver and respond to low level, weak signals received by the receiver. A common requirement of signal strength meters is that the signal strength be indicated on a logarithmic scale over the usable range of a receiver.

Signal strength meters have been employed heretofore in radio receivers of various types, for example, vacuum tube receivers and, more recently, transistor receivers. When used in a vacuum tube receiver, a signal strength meter has typically been driven by an AGC voltage of the receiver. In this case, the variable gain nature of the vacuum tube providing the AGC voltage automatically provides the logarithmic scale required of the meter. A common variant has been to drive the meter by the plate current in a vacuum tube employed in the receiver. In the case of a transistor radio receiver, a signal strength meter has similarly been driven by an AGC voltage. However, in most transistor radio receivers this AGC voltage is very non-linear and the resulting meter reading is quite unsatisfactory since it rises rapidly and abruptly at low signal levels and barely moves over most of the remaining range of the receiver. As a result, a pilot may be led to believe that he is very close to a target when he is in fact some distance away. This situation, in which there is basically no meter deflection or maximum deflection, with little in between, is less than satisfactory. Some attempts have been made to solve the above problem in transistor radio receivers, such as using an AGC current to drive a meter, but AGC current does not flow until the received signal is reasonably strong. As a result, weaker received signals cause no deflection, even if the AGC current is amplified by an amplifier.

SUMMARY OF THE INVENTION

In accordance with the present invention a signal strength indicator circuit is provided for a radio receiver which overcomes the shortcomings and disadvantages of prior art meter arrangements as discussed hereinabove. The radio receiver with which the signal strength indicator circuit is intended to operate is adapted to receive signals from a transmitter and is operative in the absence of signals received from the transmitter to produce on a control line thereof a dc control voltage signal of a first value and in response to signals received from the transmitter to produce on the control line thereof dc control voltage signals of values in a range between the first value and a second value. The radio receiver further includes AGC circuitry operative to draw current from the signal strength indicator circuit when a dc control voltage signal on the control line has the second value.

The signal strength indicator circuit in accordance with the invention includes an input terminal coupled to the control line of the radio receiver and an output terminal coupled to the AGC circuitry of the receiver. The input terminal is adapted to receive each dc control voltage signal on the control line of the receiver. The signal strength indicator circuit further includes a signal strength indicator means and a control device having first, second and third electrodes. The first electrode of the control device is coupled to the output terminal and the second electrode is coupled to the signal strength indicator means. A first resistance means is connected in series with the input terminal and the third electrode of the control device and a second resistance means is coupled between the input terminal and the output terminal and in parallel with the first resistance means and the control device.

The signal strength indicator circuit means additionally includes a reference circuit means coupled to the output terminal. The reference circuit means operates when a dc control voltage signal on the control line of the receiver has the first value indicative of the absence of signals received by the receiver from a transmitter to produce a dc voltage signal at the output terminal of essentially the same value as the dc control voltage signal on the control line of the receiver. The reference circuit means, in conjunction with the first and second resistance means and the control device, further operates in response to dc control voltage signals on the control line of the receiver within the range of values between the first and second values and indicating the receipt by the receiver of signals from a transmitter to establish dc voltage signals at the output terminal having values related to the values of the dc control voltage signals on the control line of the receiver. The reference circuit means, first and second resistance means, and the control device further operate in the above instance to supply indicator signals via the second electrode of the control device to the signal strength indicator means having values directly proportional to the values of the control voltage signals on the control line of the receiver.

The signal strength indicator means operates in response to the indicator signals received thereby to provide visual indications having values proportional to the values of the indicator signals. The signal strength indicator means further operates when the AGC circuitry of the receiver draws current from the indicator circuit when the dc control voltage signal on the control line has the second value to receive indicator signals via the second electrode of the control device and to provide visual indications having values proportional to the values of the indicator signals.

BRIEF DESCRIPTION OF THE DRAWING

Various objects, features and advantages of a signal strength meter circuit in accordance with the invention will be apparent from the following description taken in conjunction with the accompanying drawing in which:

FIG. 1 is a block diagram of an FM radio receiver employing a signal strength meter circuit in accordance with the present invention;

FIG. 2 is a schematic diagram of the signal strength meter circuit in accordance with the invention.

DETAILED DESCRIPTION OF THE INVENTION

Figure 3:
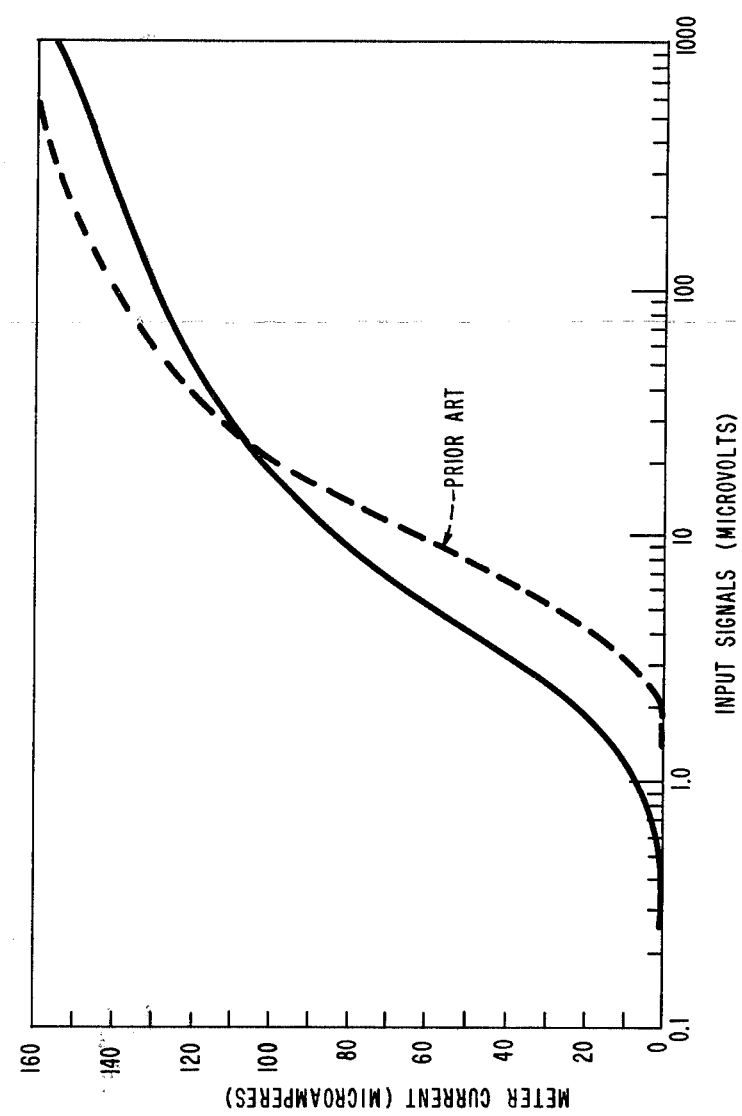
FIG. 3 illustrates waveforms of deflection of a meter employed in the meter circuit in accordance with the invention and a meter employed in a typical prior art signal strength meter arrangement.

Referring now to FIG. 1, there is shown an FM radio receiver 1 employing a signal strength meter circuit 2 in accordance with the present invention. The radio receiver 1 includes a tuner 3 which is adapted to respond to a particular frequency, for example, 44 Mhz, as received by an antenna 5 from a target such as a ground transmitter. Typically, the transmitter transmits this signal to enable the pilot of an aircraft to locate the transmitter. The output of the tuner 3, at the tuned frequency, is mixed within a mixer 6 with a signal from a local oscillator (not shown), for example, at a frequency of 53.9 Mhz, to produce a difference signal at its output having a frequency equal to the difference between the two signals applied to the mixer 6, for example, 9.9 Mhz (53.9 Mhz–Mhz) for the abovementioned signals.

The difference signal produced by the mixer 6 is amplified by an IF amplifier 8 and applied to a peak amplitude detector 10. The peak amplitude detector 10 operates to produce a dc output voltage signal representative of the peak amplitude value of the i.f. output signal produced by the IF amplifier 8. Any spurious or unwanted modulation of the i.f. signal is removed (averaged) by a filter 12. The dc voltage signal at the output of the filter 12 is amplified by a dc amplifier 14 and coupled through an emitter follower circuit 15 to a control line 16 to the signal strength meter circuit 2.

In the absence of signals received by the receiver 1 from a target, noise is generally present and processed within the receiver to produce a dc voltage signal on the control line 16 of the emitter follower circuit 15 having a generally fixed value, for example, about 5 volts. As will be discussed more fully hereinafter, this dc voltage signal is applied by the signal strength meter circuit 2 to an AGC (automatic gain control) line 22 coupled to a pair of AGC circuits 18 and 20. The AGC circuits 18 and 20 operate in response to the dc voltage signal on the AGC line 22 to maintain the gain of the tuner 3 and the IF amplifier 8 at their maximum values. These values of gain are maintained until the value of the voltage signal at the output of the emitter follower circuit 15 rises to a particular value, for example, 8 volts, due to signals received by the receiver from a target. Above the 8-volt level, the AGC circuits 18 and 20 begin rapidly to reduce the gains of the tuner 3 and the IF amplifier 8 so as to prevent overloading of these components. The AGC circuits 18 and 20 are typically implemented by transistors which are non-conducting between 5 and 8 volts (during which there is no gain change) and conducting above 8 volts (during which there is a gain change).

Above the 5volt level at the output of the emitter follower circuit 15, the signal strength meter circuit 2 operates to cause a needle of a meter 2a employed therein to deflect as the value of the voltage signal at the output of the emitter follower circuit 15 rises above 5 volts and approaches the aforementioned higher value (8 volts) due to signals being received by the receiver 1 from a target. As will be apparent hereinafter, this deflection commences for small, low-level signals received by the receiver 1 from a target and increases as the signals increase in intensity. As the 8-volt level is approached and the AGC circuits 18 and 20 draw current from the meter circuit 2, the meter 2a continues to display this current flow by deflection of the needle of the meter 2a. Thus, a pilot of an aircraft employing the receiver 1 can note a deflection of the needle of the meter 2a even when some distance away from a target, or for weak signals, and observe changes as the aircraft moves away from or toward the target. Further, the deflection of the needle of the meter 2a over its entire range can be generally continuous and linear as opposed to nonlinear deflections as in the case of prior art receivers as previously mentioned.

The signal strength meter circuit 2 in accordance with the invention is shown in greater detail in FIG. 2. The signal strength meter circuit 2 includes an input terminal 25 coupled to the emitter follower circuit 15 (e.g., to the emitter of the emitter follower circuit) and an output terminal 26 coupled to the AGC line 22. The input terminal 25 is connected in common to first ends of a pair of resistances R1 and R2, the opposite ends of the resistances R1 and R2 being connected to the emitters of a pair of npn transistors Q1 and Q2 arranged in parallel. The bases of the transistors Q1 and Q2 are connected in common to the output terminal 26. The collector of the transistor Q2 is unconnected (floats) so that the transistor Q2 behaves as a diode. This transistor "diode" is used to provide temperature compensation for the meter circuit 2. Additional temperature compensation may be provided by selecting the transistors Q1 and Q2 so that they are physically housed within the same package (e.g., such as a dual transistor package). Further, if the receiver 1 is subject to temperature changes, the resistance R2 may be used with another resistance R2$^1$, shown in phantom in FIG. 2, which is selected to be of a temperature sensitive type so as to match the temperature characteristics of the receiver. In this case, the combined values of the resistances R2 and R2$^1$ should be made about equal to the value of the resistance R2 without temperature compensation. The collector of the transistor Q1 is connected in series with a resistance R3 and the signal strength meter 2a to ground potential. A resistance R4 is connected across the meter 2a. The resistances R3 and R4 serve to provide the desired load for the transistor Q1 and to establish the proper scale factor for the meter.

The signal strength meter circuit 2 further includes a reference circuit 30 connected between the output terminal 26 and ground potential. The reference circuit 30 includes a pair of resistances R5 and R6 connected in series to ground potential, and a source of voltage +V, for example, +9 volts, connected through a resistance R7 to the juncture of the resistances R5 and R6.

In the absence of signals being received by the receiver 1 from a target, the voltage signal established at the input terminal 25 due to the processing of noise within the receiver has a typical value of about 5 volts. The reference circuit 30 operates at this time to establish a voltage at the juncture of the resistances R5 and R6 of about 4.5 volts so that the voltage signal at the output terminal 26 has a value nearly equal to the value of the voltage signal at the input terminal 25, specifically, 4.5 volts plus about 0.7 volt drop across the base-emitter junction of the transistor Q2, or about 5.2 volts. This 5.2 volt signal is applied to the AGC line 22 and from the AGC line 22 to the AGC circuits 18 and 20. The AGC circuits 18 and 20 operate in response to the 5.2 volt signal to maintain the gains of the tuner 3 and the IF amplifier 8 at their maximum values, as previously mentioned. With the input terminal 25 at about 5 volts, no current flows through the transistors Q1 and Q2 with the result that no current flows through the signal strength meter 2a to cause deflection of the needle thereof.

As the value of the voltage signal at the input terminal 25 rises above the 5 volt level, due to the receipt by the receiver 1 of signals from a target, current begins to flow through the resistances R1 and R2 (or R2 and R2¹) and the base-emitter junctions of the transistors Q1 and Q2 and through the resistance R5. The current flow through the base-emitter junction of the transistor Q1 is amplified at the collector thereof by the beta of the transistor Q1 and applied as an indicator current through the resistance R3 to the meter 2a to cause deflection of the needle thereof. As the value of the voltage signal at the input terminal 25 rises, the value of the voltage signal at the output terminal 26 also rises and is coupled via the AGC line 22 to the AGC circuits 18 and 20 to be used by the AGC circuits 18 and 20 to maintain the gains of the tuner 3 and IF amplifier 8 at the desired maximum values.

When the value of the voltage signal at the input terminal 25 reaches a predetermined value, for example, 9 volts, the value of the current flow through the transistors Q1 and Q2 and, thus, the indicator current to the meter 2a, also increases and the value of the voltage signal at the output terminal 26 and, thus, on the AGC line 22, rises to about 8 volts. At this point, the AGC circuits 18 and 20 operate (for example, by the transistors therein switching from their non-conducting states to their conducting states) to reduce rapidly the gains of the tuner 3 and the IF amplifier 8. As the AGC circuits 18 and 20 draw current from the meter circuit 2, the current in the collector circuit of the transistor Q1 is displayed by the meter 2a by the deflection of the needle of the meter 2a. The value of the current flow through the meter 2a and, therefore, the range of deflection of the needle of the meter 2a, is established by the proper selection of values for the resistances R1 and R2 (or R2 and R2¹).

The signals strength meter circuit 2 as described above is capable of causing deflection of the needle of the meter 2a over essentially the entire 5-9 volt range of signals at the input terminal 25 and during the time that the AGC circuits 18 and 20 draw current from the meter circuit 2. Thus, as soon as the value of a signal at the input terminal 25 increases above about 5 volts there is a deflection of the needle of the meter 2a to indicate this event. There is no delay or lag in the response of the meter 2a as is characteristic of prior art signal strength meter arrangements.

The advantage of the signal strength meter circuit 2 of the present invention over prior art arrangements is illustrated in FIG. 3. In FIG. 3 the solid curve represents the deflection (in microamperes) of the needle of the meter 2a of the signal strength meter circuit 2 of the present invention over a range (logarithmic) of values of input signals received by the receiver 1. The dotted curve represents the deflection of a meter of a typical prior art signal strength meter arrangement. As may be noted from the curves of FIG. 3, the deflection of the needle of the meter 2a of the signal strength meter circuit 2 of the present invention occurs almost immediately for weak, low-level signals and is generally more linear than the deflection of the needle of the meter of the prior art arrangement. As a result, a user (e.g., a pilot of the receiver may be apprised almost immediately of the receipt of a signal from a target and facilitate the location of the target.

Some typical values of the components of the signal strength meter circuit 2 which may be used with the signals as discussed above are set forth hereinbelow:

| R1 | 1.2 Kilohms |
|---|---|
| R2 | 13 Kilohms, or 10 Kilohms when used with R2¹ |
| R2¹ | 3.3 Kilohms (TM ⅛, Texas Instruments) |
| R3 | 75 ohms |
| R4 | 1.5 Kilohms |
| R5 | 350 Kilohms |
| R6 | 120 Kilohms |
| R7 | 100 Kilohms |
| Q1, Q2 | 2N3804 dual transistor |
| V | 9 Volts |

While there has been described what is considered to be a preferred embodiment of the invention it will be obvious to those skilled in the art that various changes and modifications may be made therein without departing from the invention as called for in the appended claims.

What is claimed is:

1. A signal strength indicator circuit for a radio receiver employing AGC, said radio receiver being adapted to receive signals from a transmitter and operative in the absence of signals received from the transmitter to produce on a control line thereof a dc control voltage signal of a first value and in response to signals received from the transmitter to produce on the control line thereof dc control voltage signals of values in a range between the first value and a second value, said radio receiver further including AGC circuitry operative to draw current from the signal strength indicator circuit when a dc control voltage signal on the control line has the second value, said signal strength indicator circuit comprising:

an input terminal coupled to the control line of the radio receiver and adapted to receive each dc control voltage signal on the control line of the receiver;

an output terminal coupled to the AGC circuitry of the receiver;

signal strength indicator means;

a control device having first, second and third electrodes, the first electrode being coupled to the output terminal and the second electrode being coupled to the signal strength indicator means;

first resistance means connected in series with the input terminal and the third electrode of the control device;

second resistance means coupled between the input terminal and the output terminal and in parallel with the first resistance means and the control device; and reference circuit means coupled to the output terminal, said reference circuit means being operative when a dc control voltage signal on the control line of the receiver has the first value indicative of the absence of signals received by the receiver from a transmitter to produce a dc voltage signal at the output terminal of essentially the same value as the dc control voltage signal on the control line of the receiver;

said reference circuit means, said first and second resistance means and said control device being operative in response to dc control voltage signals on the control line of the receiver within the range of values between the first and second values and indicating the receipt by the receiver of signals from a transmitter to establish dc voltage signals at the output terminal having values related to the values of the dc control voltage signals on the control line of the receiver, and further operative to supply indicator signals via the second electrode of the control device to the signal strength indicator means having values directly proportional to the values of the control voltage signals on the control line of the receiver, said signal strength indicator means being operative in response to the indicator signals to provide visual indications having values proportional to the values of the indicator signals received thereby; and said signal strength indicator means being further operative when the AGC circuitry of the receiver draws current from the indicator circuit when the dc control voltage signal on the control line has the second value to receive indicator signals via the second electrode of the control device and to provide visual indications having values proportional to the values of the indicator signals.

2. A signal strength indicator circuit in accordance with claim 1 wherein:
the control device is a transistor, the first, second and thrid electrodes representing the base, collector and emitter electrodes of the transistor, respectively.

3. A signal strength indicator circuit in accordance with claim 2 wherein:
the signal strength indicator means includes a meter connected in series with the collector electrode of the transistor and having a deflective needle, said needle being deflected by amounts in accordance with the values of the indicator signals received thereby from the transistor.

4. A signal strength indicator circuit in accordance with claim 3 further comprising:
a diode device connected in series with the second resistance means and output terminal for providing temperature compensation for the signal strength indicator circuit.

5. A signal strength indicator circuit in accordance with claim 4 wherein:
the second resistance means includes a temperature sensitive resistance element.

6. A signal strength indicator circuit in accordance with claim 4 wherein the reference circuit means comprises:
a voltage source operative to apply a dc voltage of a predetermined value;
a source of reference potential; third and fourth resistance means connected in series between the output terminal and the source of reference potential; and
fifth resistance means connected between the juncture of the third and fourth resistance means and the voltage source.

7. A signal strength indicator circuit in accordance with claim 6 wherein:
the range of deflection of the needle of the meter is determined by the ratio of the values of the first and second resistance means.

8. A signal strength indicator circuit in accordance with claim 7 wherein:
the second resistance means includes a temperature sensitive resistance element.

* * * * *